April 28, 1959     I. J. FINK ET AL     2,883,890

AUTOMATIC DRILL CHANGER FOR CHUCKS

Filed Jan. 20, 1958     2 Sheets-Sheet 1

INVENTORS
Isreal J. Fink
Edgar D. Price
BY
Murray, Sackhoff & Murray
ATT'YS

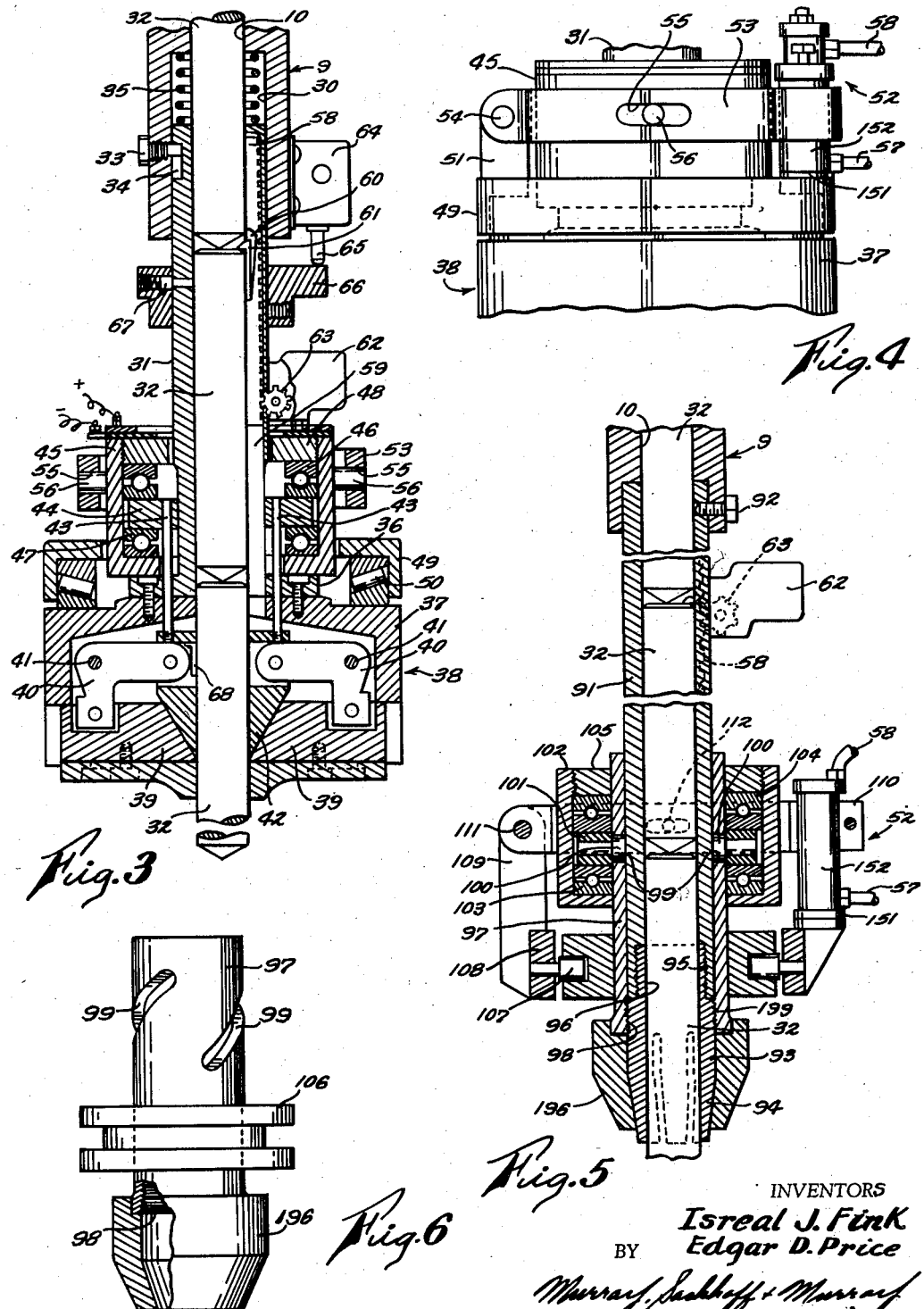

United States Patent Office 2,883,890
Patented Apr. 28, 1959

2,883,890

AUTOMATIC DRILL CHANGER FOR CHUCKS

Israel J. Fink, Cincinnati, and Edgar D. Price, Greenhills, Ohio; said Price assignor to said Fink Application January 20, 1958, Serial No. 709,934

6 Claims. (Cl. 77—32.7)

The present invention relates to improvements in tool changing devices and is particularly directed to an automatic drill changing device for tool chucks.

It is common practice to produce machine parts by moving said parts progressively from one metal forming station to another either upon a straight line conveyor system or a turret type conveyor. Usually a great many metal forming stations are actuated simultaneously during dwell periods of the conveyor system and as the tools at these stations become dull and require replacement, the entire assembly line must be shut down for tool changing purposes. The replacement step requires considerable time, especially where a number of metal forming stations are concerned, and this loss of time results in slow down and inefficient use of the particular assembly line. To overcome the present drawbacks in tool change over procedures and especially in changing drills at a plurality of stations we have provided an automatic drill changing mechanism that requires a minimum of time in its operation, will obtain maximum performance from the drills for a particular machine upon which it is installed and will be automatically actuated for drill replacement purposes at a definite, predetermined time.

Another object of the invention is to provide an improved drill changing device that may be installed in existing equipment and which may be used with few alterations in other machines that require a mechanism that will provide a quick and efficient tool change over operation.

Other objects of the invention will become apparent from the accompanying specification and drawings which illustrate preferred forms of our invention.

In the drawing:

Fig. 3 is a central section taken through one form of our automatic drill changer shown associated with a conventional tool chuck.

Fig. 4 is a fragmental, side elevational view of the chuck portion of the device shown in Fig. 3.

Fig. 5 is a central section taken through a modified form of our drill changer as applied to another type of conventional chuck.

Fig. 6 is a side elevational view of the chuck actuator element for the device shown in Fig. 5, parts being broken away and shown in section.

The invention is herein illustrated and described as associated with a more or less conventional hydraulically operated drill press having a rotated and reciprocated part that carries a known drill chucking device, and only those parts of the press or chuck which are necessary to a complete understanding of the present invention are herein shown and described in detail. The parts of a press and/or chucks not shown and described in detail per se form no part of the present invention and are known commercially in the art.

Figure 1:
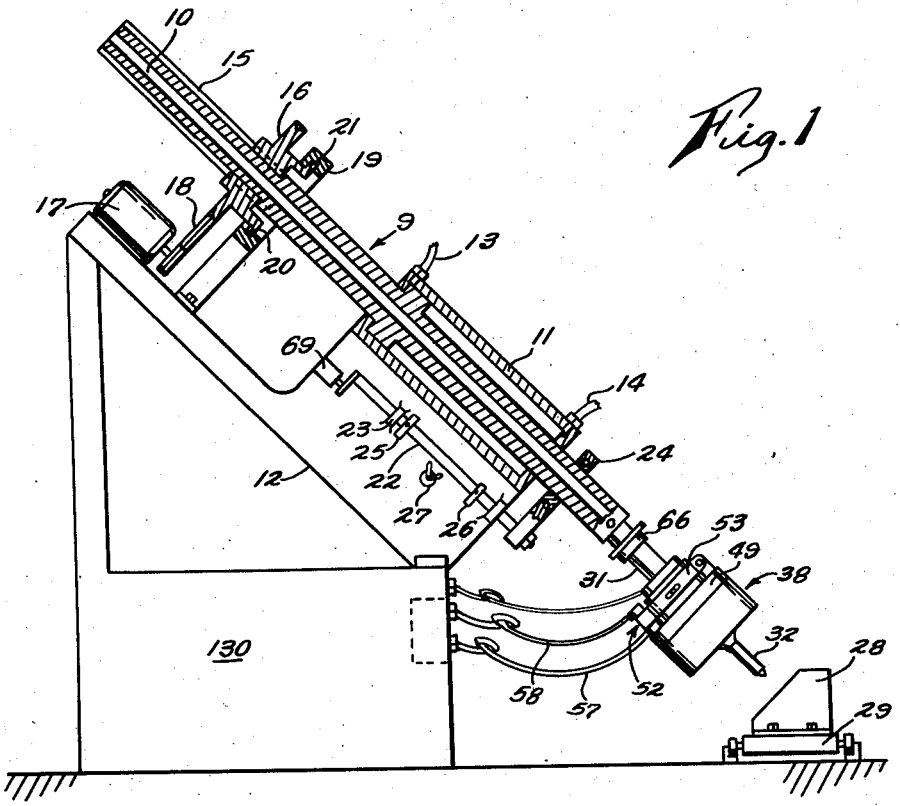
Fig. 1 is a side elevational view of an hydraulically operated drill press embodying our automatic drill changing device, parts being shown in central section.

Referring to the drawing the numeral 9 indicates a rotating and reciprocating spindle that has an axial hole 10 extending therethrough which forms a tool magazine for the device. This hole is preferably circular in section and has a diameter just larger than the outside diameter of tools, such as drills, to be stored in the magazine in end-to-end relationship. The spindle is reciprocated by means of a piston-cylinder arrangement 11 mounted upon an inclined bed 12 that is in turn supported upon a suitable machine base 130. As best illustrated in Fig. 1 the piston-cylinder arrangement is operated by means of alternate fluid pressure and fluid exhaust lines 13 and 14 which are connected to a conventional hydraulic pressure system (not shown). The upper end of the spindle 9 is splined at 15 to slidably engage a drive pulley 16 that is keyed to the spindle and driven by an electric motor mounted on the bed 12, said motor being connected to the pulley 16 by a belt 18. The pulley 16 is secured against axial movement by means of a yoke 19 mounted on the bed 12 and having an annular groove 20 therein for rotatably receiving a peripheral flange 21 formed on said pulley.

The hydraulic system for the piston-cylinder arrangement 11 is controlled by a control rod 22 mounted for axial sliding movement in bearings 23 and 24 on the bed 12 and connected to the spindle by a rotatable connection 24. Limit dogs 25 and 26 are adjustably fixed on the control rod 22 and alternately actuated a reversing dog 27 that controls a pilot valve for the hydraulic system in a well known manner. It will, therefore, be understood that alternate introduction of pressure fluid into the lines 13 and 14 under the control of the pilot valve will continuously reciprocate the spindle 9 toward and away from a piece of work 28, shown bolted to a laterally movable conveyor 29 and also move the spindle away from the work toward the withdrawn, inoperative position shown in Fig. 1. As has been said the press illustrated in Fig. 1 may be one of many metal forming stations positioned beside the work conveyor 29, and it is contemplated that all the reciprocated tool carrying parts at the stations may be actuated simultaneously by a single hydraulic system controlled from a single instrument panel.

One form of our automatic drill changer for chucks is illustrated in Figs. 3 and 4 of the drawing, wherein it will be seen that the lower end of the spindle 9 is provided with an annular recess 30 for slidably receiving the upper end of a hollow quill 31, said hollow quill 31 being in axial alignment with the spindle 9 to provide a continuation of the hole 10 in the spindle which serves as a magazine for a stack of tools 32. The quill is given limited axial displacement relative to the spindle 9 by means of a set screw 33 threaded in the spindle and having its inner end extending into a slot 34 formed in the upper end of the quill 31. An expansible spring 35 is positioned between the bottom of the recess 30 and the upper end of quill 31, for purposes to be hereinafter described. The lower end of the quill 31 has a laterally extending flange 36 thereon to which is bolted the head 37 of a conventional chuck 38.

The chuck has mounted therein a number of radially movable jaws 39 which are controlled by bell cranks 40 pivotally mounted with the head 37 on pins 41, the cranks being pivoted at their ends to an axially movable, hollow cone 42. The actuator for the chuck jaws comprises a number of control rods 43 connected at their lower ends to the cone 42 and which have their upper ends connected to a control ring 44 encircling the quill 31. The control ring is housed within a non-rotating case 45 between sets of antifriction bearings 46—47, the ring and the bearings being held in the case against axial displacement by a cap 48 threaded in the upper end of the case. Actuator also has a non-rotating ring 49 mounted on the chuck head 37 by anti-friction roller bearings 50, said ring having an upstanding lug 51 positioned at one end thereof whilst the other end is secured to the piston element 151 of a piston-cylinder assembly, generally indicated by the reference numeral 52. One side of a ring-shaped rock lever 53 is pivotally connected to the lug 51 by a pin 54 whilst the opposite side of the rock lever is fixed to the cylinder element 152 of the piston-cylinder arrangement 52. Opposed slots 55 are formed in the rock lever for receiving pins 56 mounted on the case 45 and projecting from opposite sides thereof at right angles thereto. By alternately introducing pressure fluid into opposite ends of the piston-cylinder arrangement 52 through a line 57 and then a line 58 the lever will be rocked on the pivot 54 to respectively move the case 45 toward and then away from the chuck 38 and such relative movement will be transmitted to the chuck jaws through rods 43 to respectively move the jaws away from one another to release the tool 32 and to then move said jaws toward one another to clamp said tool in the chuck.

As best shown in Fig. 3 it will be noted that the hollow center of the quill 31 is a continuation of the magazine in the spindle 9 and that the tools are stacked in the magazine and the quill in axial end-to-end alignment, the lowermost tool being in position to be moved into the chuck by a reciprocating feed mechanism, associated with the quill.

The means for axially feeding the lowermost tool 32 in the magazine into its chucked position is shown in the drawing as an elongated rack bar 58 slidably mounted in a groove 59 formed in the internal face of the quill 31. The rack bar has a recess 60 on the inner side of its upper end portion for mounting a laterally movable spring finger 61 which is spring urged inwardly to engage the upper end of the lowermost tool 32 in the stack when the rack bar is in its upper position. A reversible motor 62 is mounted on the quill 31 and drives a pinion 63 which meshes with the rack bar 58. Mounted on the lower end of the spindle 9 is an electric switch 64 adapted to close an electric circuit when its actuator stem 65 is sufficiently depressed by contact with a ring member 66 secured to the quill 31.

It will be noted that the spindle and quill are in an upstanding position in the drill press and it is, therefore, practical to utilize the force of gravity to advance the tools 32 axially through the magazine and into position for mechanical feeding of the lowermost tool into the chuck, a spring detent 67 being mounted in the ring 66 and projecting into the path of the tools to maintain the lowermost tool in position when the tool feed means is being returned upwardly to its operative position shown in Fig. 3. A spring pawl 68 is also interposed in the path of the tool at it moves into position in the chuck to prevent it from falling out of the chuck between the time it is fed into position in the chuck until the jaws actually clamp it in operative working position therein.

Figure 2:
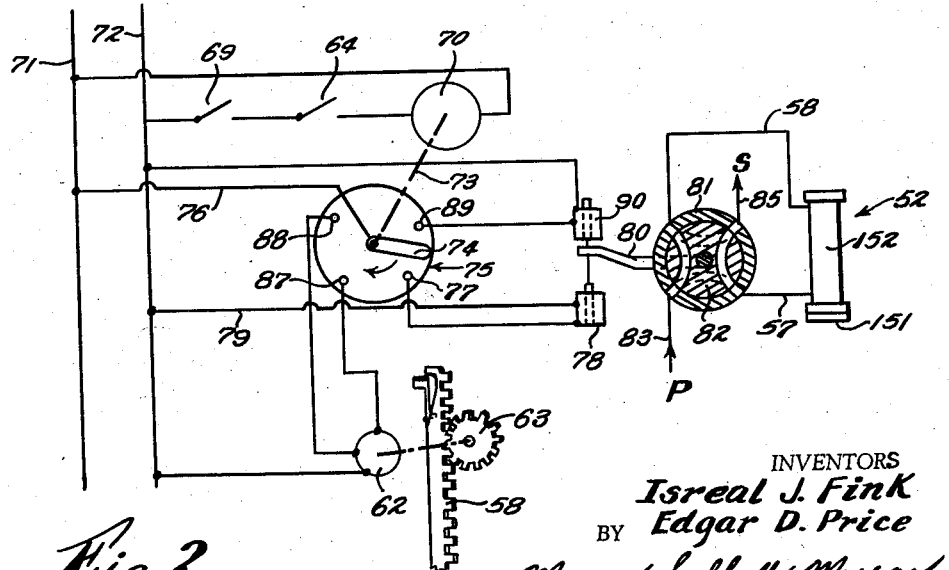
Fig. 2 is a diagrammatic view of the control system for the device shown in Fig. 1.

With particular reference to Fig. 2 the operation of the automatic drill changer shown in Figs. 1–4 of the drawing will now be described. The numeral 69 indicates an electric switch which is closed by the control rod 22 for the piston-cylinder motor 11 when the press parts are in their upper retracted positions. In operation the tool spindle will be rotated and reciprocated in the usual manner thus feeding and returning the drill 32 held in chuck 38 toward and away from the work 28 to perform the usual drilling operations. After a predetermined number of such drilling operations the drill 32 in the chuck 38 will become dull and require more axial pressure than normal to feed the drill into the work. Under this increased drill feeding pressure the spring 35 will be depressed a greater distance than normal causing relative axial movement between the quill 31 and the spindle 9 which will in turn cause the ring 66 to depress the stem 65 of switch 64 to close it. The switch is the type that will remain closed until it is manually released by pushing a suitable button positioned on the switch (Fig. 3). Now with reference to Fig. 2 it will be noted that the switch 64 and the upper limit switch 69 are in series with a single revolution motor 70 and that the series circuit is connected to a power line generally indicated by the reference numeral 71—72. When switch 64 is closed in response to extraordinary drill feed pressure required by the press to operate a dull drill and upon closing the switch 69 when the chuck and spindle have been returned to inoperative position, the motor 70 will be actuated to rotate through one revolution. The motor shaft 73 of the motor 70 is connected to an arm 74 of a sequence switch 75, said arm being electrically connected to power line 71 by a line 76. The first contact 77 of the sequence switch which the arm 74 engages in its cycle is connected to a solenoid 78, said solenoid 78 being electrically connected to line 72 by a line 79. When solenoid 78 is actuated it operates an arm 80 of a pilot valve 81 to move the rotatable element 82 of the valve into the position indicated in dotted lines in Fig. 2. In that position the pilot valve will connect a fluid pressure line 83 to one side of the cylinder 52 through the line 57 whilst the opposite end of the cylinder 52 will be connected to a sump line 85 through the line 58. This position of the pilot valve will introduce pressure fluid into the bottom end of the piston cylinder 52 to operate the actuator which in turn will release the jaws 39 from the tool 32 held in the chuck.

The second position of the arm 74 of sequence switch 75 will cause the arm to engage a contact 87 that will cause rotation of the electric motor 62 in a rotary direction that will move the rack 58 in a drill feeding direction, whilst engagement of the arm 74 with a third contact 88 when engaged by the arm 74 will actuate the motor to return the rack to its withdrawn, inoperative position. Finally the arm 74 of the sequence switch will engage contact 89 which will cause operation of a solenoid 90 and movement of the arm 80 into the position of the pilot valve 81 illustrated in full lines in Fig. 2 wherein the pressure line 83 will be connected to line 58 whilst line 57 for the pressure cylinder will be connected to sump line 85 to reverse the action of the piston-cylinder 52 to clamp the jaws on the tool in the chuck.

We have shown a modification of our device in Figs. 5 and 6 of the drawing wherein the numeral 91 indicates a hollow quill fixed against rotation in the bottom of the spindle 9 by means of a set screw 92. In this form of the invention the jaws are formed in a jaw member 93 by making longitudinal cuts in the tapered end 94 of the jaw member, said jaw member being fixed against rotation in the bottom of the quill 91 by a reduced externally threaded end portion 95 that is threaded in an internally threaded bore 96 formed in the bottom of the quill 91. The jaw actuator (Fig. 6) comprises tapered head 196 secured as by welding to a sleeve 97, said head 196 and the sleeve 97 encircling the jaw member 93 and the lower end of the quill 91 respectively. The lower end of the sleeve is provided with intrenal threads 98 which are threaded to external threads 199 formed on the outer wall of the jaw member 93. By rotating the actuator relative to the jaw member 93 the actuator will move axially with respect to the jaw member and compress the jaws toward the work 32 to clamp the same in the chuck and turning the actuator in the opposite direction will cause the jaws to expand and release the work therefrom. The means for actuating the jaws by rotating the actuator comprises an opposed set of spiral grooves 99 formed in the sleeve which are engaged by rollers 100 mounted on a control ring 101. This control ring is mounted for rotation within a case 102 between bearings 103 and 104, the bearings and ring being held in the case against axial movement by a cap 105 threaded in the upper end of the case. The case 102 is moved axially to rotate the actuator by a grooved ring 106 welded or otherwise fastened to the sleeve 97 and in which a number of rollers 107 rotate, said rollers being mounted on a ring 108. The piston element 151 of the piston-cylinder 52 is mounted upon one end of the ring 108 whilst the opposed side of the ring 108 has lug 109 positioned thereon. The upper end of the lug 109 is pivotally mounted to a rock lever 110 by means of a pin 111, the forward end of the rock lever being secured to the cylinder 152 of the piston-cylinder arrangement. The mid-portion of the rock lever 110 is pivoted to a pin 112 that is fixed to and extends from the case 102. When pressure fluid is introduced into one side of the piston-cylinder 52 the rock lever will be moved toward the ring 108 thus moving the case 102 in one direction to rotate the actuator sleeve 97 and its head 196 which moves the head downwardly on the jaws 93 to open the chuck whilst introduction of pressure fluid in the other side of the piston-cylinder arrangement will rotate the actuator sleeve 97 and its head 196 in an opposite direction to compress the jaws and clamp the work in the chuck.

It will be noted that the quill 91 is fixed to the spindle 9 and that the axially movable spring pressure connection and pressure responsive switch 64 of the device shown in Figs. 1–4 are omitted in the modified form in Figs. 5 and 6. In the latter instance we contemplate that the means responsive to the dull condition of a tool in the chuck could either be a timer that after a predetermined lapse of time would signal that such a condition existed or the means could be a counter operated by a reciprocated part of the press. In either instance these devices could be incorporated as electric mechanisms into the control system shown in Fig. 2 by substituting either of them for the switch 64 in the electric circuit identified by the reference numerals 69, 64, 70, 71 and 72.

Having now described and illustrated our invention we wish it to be understood that our invention is not to be limited to the specific forms or arrangements of parts herein described and shown.

What is claimed is:

1. In a device of the character described a rotating and reciprocating spindle having an axial tool magazine formed therethrough, a tool chuck mounted on one end of the spindle and having a tool opening extending therethrough in axial alignment with the magazine, radially movable jaws in the chuck, a chuck actuator, a rotatable connection for mounting the actuator on the chuck, power means on the actuator for moving the jaws together to clamp the tool in the chuck and to move said jaws apart to release said tool, intermittent reciprocable feed means slidable in a groove in the spindle for moving the lowermost tool from the magazine into operative position in the opening in the chuck, and means operative when the chuck is released to actuate the feed means.

2. In a device of the character described a rotating and reciprocating spindle having an axial tool magazine extending therethrough to receive a stack of tools in axial, and end-to-end relationship, a tool chuck mounted on one end of the spindle and having a tool opening extending therethrough and in axial alignment with the magazine, radially movable jaws in the chuck, a chuck actuator, a rotatable connection for mounting the actuator on the chuck, a fluid pressure actuated piston-cylinder assembly on the actuator which in one position clamps the tool in the jaws and in opposite position releases the jaws from the tool, reciprocated feed means in the spindle for moving the lowermost tool from the magazine into operative position in the opening in the chuck, reversible motor means for the reciprocated feed means, master switch means responsive to a dull condition of the chucked tool, and a sequence switch actuated by the last named means for first operating the piston-cylinder assembly to release the chuck jaws, secondly operate the reversible motor to feed a new tool from the magazine into operated position in the chuck, thirdly to reverse the said motor to return the feed means to normal inoperative position and fourthly to operate the piston-cylinder assembly to clamp the jaws on the said tool.

3. In a machine of the character described a base, a rotated and reciprocated spindle mounted in an upstanding position on the base, said spindle having an axial opening formed therethrough for receiving a stack of tools positioned in axial, end-to-end relationship in the opening, a tool chuck mounted on the lower end of the spindle and having an axial tool opening therethrough in alignment with the opening in the spindle, reciprocable axially displaced feed means slidable in the spindle for moving the lowermost tool in the spindle into operative position in the opening in the chuck, radially movable jaws in the chuck, and an actuator for moving the jaws together and into the opening to clamp the tool in the chuck, and for moving the jaws apart to release said tool.

4. In a machine of the character described a rotated and reciprocated chuck carrying spindle, a tool magazine extending through the spindle and into the chuck, intermittently operated offset feed means within the spindle wall to actuate a hooked finger for moving a tool from the magazine into the chuck, and a chuck jaw actuator on the chuck operable during tool feed periods of the intermittently operated feed means for releasing the jaws and operable during dwell periods of the feed means for clamping the jaws on the tool.

5. In a machine of the character described a rotated and reciprocated spindle for feeding and returning a tool relative to a piece of work and having an axial tool magazine extending therethrough to receive a stack of tools positioned therein in axial, end-to-end relationship, a tool chuck mounted on one end of the spindle and having a tool opening extending therethrough in axial alignment with the magazine, radially movable jaws in the chuck, a chuck actuator, a rotatable connection for mounting the actuator on the chuck, a fluid pressure actuated piston-cylinder assembly on the actuator, a two-position pilot valve which in one position introduces pressure fluid into one side of the assembly to move the actuator to release the chuck jaws from the tool and in its second position moves the actuator to clamp the jaws upon the tool, reciprocated tool feed means in the spindle for axially moving the lowermost tool from the magazine into operative position in the opening in the chuck and then returning to pick up a succeeding tool in the magazine, reversible motor means for the reciprocated feed means, a master switch actuated by the returning movement of the reciprocated spindle, switch means responsive to a dull condition of the chucked tool, and a sequence switch in series with the master switch and the switch means responsive to a dull condition of the chucked tool, and actuated thereby to operate the pilot valve and move it to its said first position, secondly to actuate the reversible motor to feed a tool to the chuck and return, and thirdly to operate the pilot valve to move it to its said second position.

6. The machine set forth in claim 5 characterized by the fact that the means responsive to a dull condition of a tool in the chuck comprises a depressible element that responds to variation of tool feed pressure exerted on the reciprocated spindle.

References Cited in the file of this patent
UNITED STATES PATENTS 2,640,253  Fink et al. _____ June 2, 1953